United States Patent
Hu et al.

(10) Patent No.: US 11,355,153 B2
(45) Date of Patent: Jun. 7, 2022

(54) METHOD FOR GENERATING A LOOP VIDEO

(71) Applicants: Inventec (Pudong) Technology Corporation, Shanghai (CN); INVENTEC CORPORATION, Taipei (TW)

(72) Inventors: Ke-Min Hu, Taipei (TW); Wei-Chao Chen, Taipei (TW); Trista Pei-Chun Chen, Taipei (TW); Yung-Yu Chuang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/029,556

(22) Filed: Sep. 23, 2020

(65) Prior Publication Data
US 2022/0084556 A1    Mar. 17, 2022

(30) Foreign Application Priority Data
Sep. 15, 2020 (CN) .......................... 202010967908.5

(51) Int. Cl.
| | |
|---|---|
| G11B 27/00 | (2006.01) |
| H04N 5/93 | (2006.01) |
| H04N 5/76 | (2006.01) |
| G11B 27/036 | (2006.01) |
| G06T 7/20 | (2017.01) |
| G06K 9/62 | (2022.01) |
| G06V 20/40 | (2022.01) |

(52) U.S. Cl.
CPC .......... *G11B 27/007* (2013.01); *G06K 9/6256* (2013.01); *G06T 7/20* (2013.01); *G06V 20/46* (2022.01); *G11B 27/036* (2013.01); *G06T 2207/10016* (2013.01); *G06T 2207/20081* (2013.01)

(58) Field of Classification Search
USPC ................ 386/278, 280, 282, 286, 314, 326
See application file for complete search history.

(56) References Cited

U.S. PATENT DOCUMENTS

| | | | |
|---|---|---|---|
| 2008/0123959 A1* | 5/2008 | Ratner .................... | G06K 9/342 382/173 |
| 2014/0327680 A1* | 11/2014 | Hoppe .................... | G06T 13/80 345/473 |
| 2018/0090171 A1* | 3/2018 | Bradley ............... | G11B 27/031 |

* cited by examiner

*Primary Examiner* — Daquan Zhao
(74) *Attorney, Agent, or Firm* — Locke Lord LLP; Tim Tingkang Xia, Esq.

(57) ABSTRACT

A method for generating a loop video comprises: obtaining an input video including multiple frames with a first frame, with each of frames having multiple pixels; extracting a moving object corresponding to a moving pixel region in the first frame with the moving pixel region having at least two pixels; inputting multiple candidate periods to a target function respectively to calculate multiple errors of the moving pixel region; determining a start frame and a loop period of the moving pixel region for each error, with the loop period being associated with one of the candidate periods; generating multiple output frames according to start frames and loop periods; and generating an output frame sequence from the output frames according to a loop parameter, wherein the output frame sequence corresponds to the loop video.

4 Claims, 6 Drawing Sheets

METHOD FOR GENERATING A LOOP VIDEO

CROSS-REFERENCE TO RELATED APPLICATIONS

This non-provisional application claims priority under 35 U.S.C. § 119(a) on Patent Application No(s). 202010967908.5 filed in China on Sep. 15, 2020, the entire contents of which are hereby incorporated by reference.

BACKGROUND

1. Technical Field

The present disclosure relates to the field of image processing, and more particularly to a method for generating a loop video.

2. Related Art

In recent years, social media has flourished, and sharing videos on the Internet has become normal. With the rise of cloud storage services, users no longer have to worry about storage space. Users casually upload the videos after shooting without caring whether or not those videos are reused. With so much new video contents created and shared everyday among people, people have little interest in older contents. This is such a waste given the meanings and culture ingredients inside those contents. It may be worthwhile giving new life to those videos.

The loop video is a medium which is in many ways intermediate between photos a video. The loop video may capture the dynamic information in the screen and represent the whole scenario in a looping form. The loop video brings immersion to the audience without being broken by the duration limitation like video. In such an era that social media develops rapidly, filming short video and sharing are already indispensable things in life, such as filming a self-study trumpet solo, recording the moment dancing with friends or sharing the fantastic performance by a busker whom you're just passing by. Those video contents are suitable to produce a loop video. However, most of the recent approaches didn't take the property of this kind of video into consideration. They aimed to perform a smooth loop video which leads to constraining people's movement into unnormal repetition, without considering the continuity of character motion.

SUMMARY

In view of the above, the present disclosure proposes a method for generating a loop video from an input video based on artificial intelligence or learning algorithm so that the present disclosure solves the problem that the loop video generated by the conventional method lacks semantic consistency and visual variety.

According to one or more embodiment of this disclosure, a method for generating a loop video comprising: obtaining an input video including a plurality of frames, wherein a first frame is included in the plurality of frames, each of the plurality of frames has a plurality of pixels; extracting a moving object from the input video, wherein the moving object corresponds to a moving pixel region in the first frame, and the moving pixel region includes at least two of the plurality of pixels of the first frame; inputting a plurality of candidate periods to a target function respectively to calculate a plurality of errors of the moving pixel region for respective ones of the candidate periods; determining a start frame and a loop period of the moving pixel region for each of the plurality of errors so as to obtain a plurality of start frames and a plurality of loop periods, wherein the loop period is associated with one of the plurality of candidate periods; generating a plurality of output frames according to the plurality of start frames and the plurality of loop periods; and generating an output frame sequence from the plurality of output frames according to a loop parameter, wherein the output frame sequence corresponds to the loop video.

In sum, the present disclosure proposes a method for generating a loop video. The proposed method creates the loop video consisted of context-aware segments based on spatiotemporal consistency and semantic constraint, and the present disclosure ensures the completeness of moving object in the loop video. The present disclosure uses frame entropy to estimate the variety of output video and keep good variety in output by dynamic strategy method and bounce point extraction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
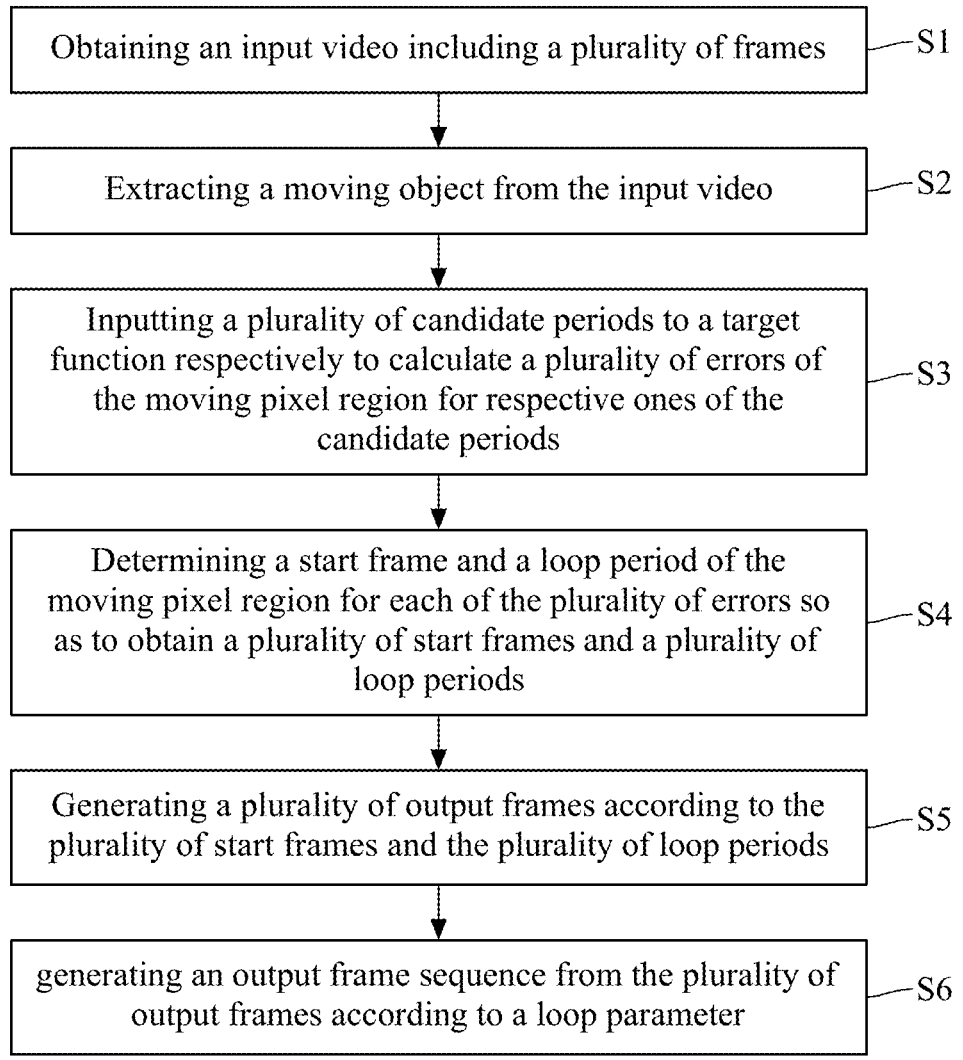
FIG. 1 is a flow chart of a method for generating a loop video according to an embodiment of the present disclosure.

Please refer to FIG. 1. FIG. 1 is a flowchart of a method for generating a loop video according to an embodiment of the present disclosure.

In overall, the method for generating a loop video of the present disclosure includes two stages, and they are analysis stage and rendering stage.

The analysis stage includes steps S1-S5 of FIG. 1 Most calculations are performed in the analysis stage. In the analysis stage, an embodiment of the present disclosure calculates a plurality of loop parameters. The present disclosure generates context-aware segmentations by minimizing the target function (energy function) which estimates a spatiotemporal consistency according to semantic constraints. In the analysis stage, the present disclosure calculates a start frame and a loop period of each superpixel. The present disclosure calculates a frame transition cost by comparing a color difference between two frames. The present disclosure obtains a bounce point by analyzing a high symmetric motion in neighboring frames. After the analysis stage, the present disclosure caches the loop parameters in specific format files for the rendering stage.

The rendering includes step S6 in FIG. 1. In the rendering stage, the present disclosure uses loop parameters to determine the suitable following frame at every moment in real-time. The present disclosure performs multi-layered blending to get final visual result with multiple layers.

Please refer to step S1, "obtaining an input video including a plurality of frames". Specifically, the input video provided by the user includes multiple frames, each of these frames has a plurality of pixels. The input video can be defined as a 3D volume V (x, t) with a 2D pixel position x and an input frame time t.

Please refer to step S2, "extracting a moving object from the input video". The moving object corresponds to a moving pixel region in each frame and has at least two pixels. One or more pixels which do not belong to any moving object form a fixed pixel region.

Figure 2:
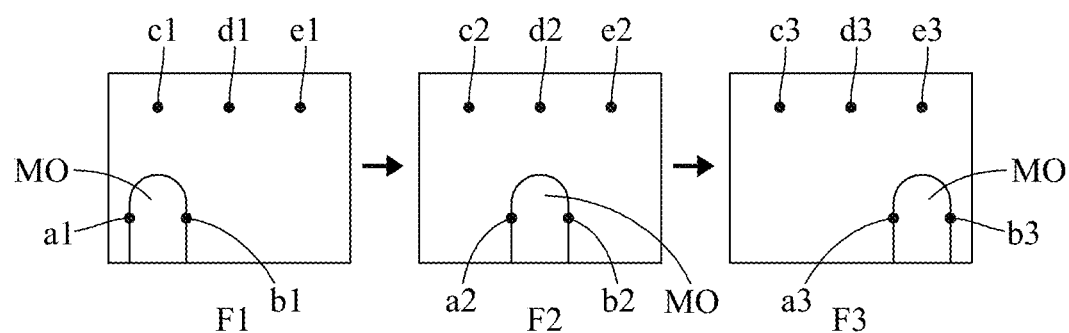
FIG. 2 is a schematic diagram of each screen of an input video.

For example, please refer to FIG. 2. FIG. 2 is a schematic diagram of each screen of an input video. In this simple example, the input video only includes a first frame F1, a second frame F2, and a third frame F3. The input video shows a moving object MO moving from left to right by these three frames. In general, there are more than two pixels in the moving objects MO. Regarding the first frame F1, all pixels in the moving object MO such as pixel a1 and pixel b1 in FIG. 2 form a moving pixel region. Each pixel outside the moving object MO such as pixel c1, pixel d1, and pixel e1 in FIG. 2 may represent one fixed pixel region respectively. In other words, the size of fixed pixel region may be one pixel or more or multiple pixels and the present disclosure does not limit thereof.

Figure 3:
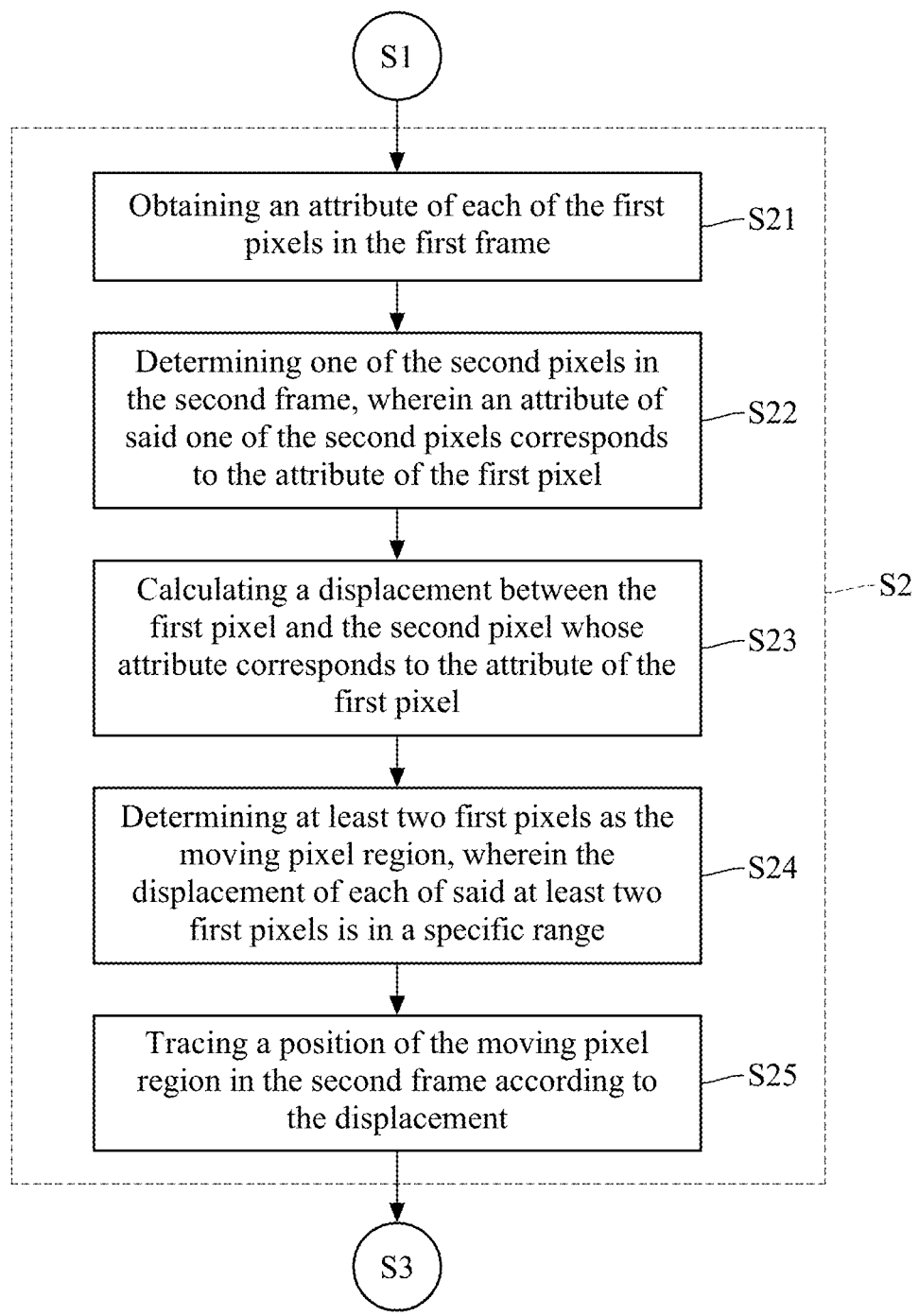
FIG. 3 is a flow chart of step S2 in FIG. 1.

Please refer to FIG. 3. FIG. 3 show an example of step S2 in FIG. 1. Please also refer to step S2 for understanding the flow in FIG. 3. Each pixel in the first frame F1 such as a1, b1, c1, d1, and e1 in FIG. 2 will be called a first pixel in below. Each pixel in the second frame F2 such as a2, b2, c2, d2, and e2 in FIG. 2 will be called a second in below.

Please refer to step S21, "obtaining an attribute of each of the first pixels in the first frame". For example, colors of the first pixel a1 and second pixel b1 in first frame are obtained in this step.

Please refer to step S22, "determining one of the second pixels in the second frame, wherein an attribute of said one of the second pixels corresponds to the attribute of the first pixel". For example, regarding the pixel a1 of the moving object MO, if the moving object is red and the part outside the moving object MO is white, this step finds multiple pixels such as a2 and b2 in the second frame F2, and the color of each of pixels a2 and b2 are identical to the color of pixels a1 in the first frame F1. Further, this step determines that the pixel corresponding to pixel a1 is pixel a1 rather than pixel a2 according to colors of pixels next to pixel a1 or the coordinate of pixel a1. Regarding pixels c1 which does not belong to the moving object MO, this step adopts the method described above to determines its corresponding second pixel c2, and so on for other pixels such as b1, d1, and e1.

Please refer to step S23, "calculating a displacement between the first pixel and the second pixel whose attribute corresponds to the attribute of the first pixel". In other embodiment, step S23 may calculate an optical flow between the first pixel a1 and second pixel a2.

Please refer to step S24, "determining at least two first pixels as the moving pixel region, wherein the displacement of each of said at least two first pixels is in a specific range". For example, since the moving object MO moves from the left side to the right side, all first pixels such as a2 and b1 in FIG. 2 satisfying the condition, "the displacement on y-axis is smaller than a certain threshold", may be served as the moving pixel region MO.

Please refer to step S25, "tracing a position of the moving pixel region in the second frame according to the displacement". Specifically, after determining all first pixels of the moving pixel region in the first frame F1, this step uses the displacement or the optical flow information to trace the moving pixel region in the following frames.

Figure 4:
FIG. 4 is a frame of the input video.
Figure 5:
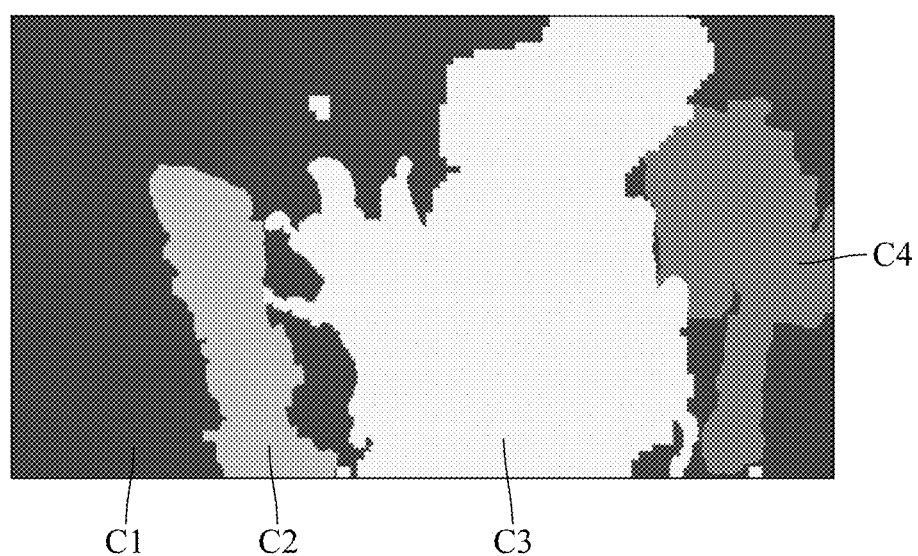
FIG. 5 is a schematic of multiple moving pixel regions determined from FIG. 4.

Please refer to FIG. F4 and FIG. 5. FIG. 4 shows a frame of the input video. FIG. 5 shows a schematic diagram of multiple moving pixel regions found from FIG. 4. After performing step S2, the present disclosure may determine a fixed pixel region C1 and moving pixel regions C2, C3 and C4, as shown in FIG. 5.

In other embodiment of the present disclosure, the moving pixel region is called a dynamic superpixel and the fixed pixel region is called a static superpixel. Each superpixel represent an object area. It should be further noticed that the detecting and tracking flow as shown in FIG. 3 is not configured to limit step S2 according to an embodiment of the present disclosure. Practically, an optical flow algorithm may be used to detect and track the moving object MO. Moreover, an object recognition model is trained beforehand according to multiple images associated with the moving object. When performing step S2, an embodiment of the present disclosure may extract the moving object MO from each frame of the input video according to this model.

Please refer to step S3, "inputting a plurality of candidate periods to a target function respectively to calculate a plurality of errors of the moving pixel region for respective ones of the candidate periods". The candidate period may be a multiple of a basic period. For example, the length of the basic period is four frames and the candidate period include 4, 8, 12, 16 . . . frames. However, the present disclosure does not limit to the above example. In an embodiment, regarding each of the moving pixel region and the fixed pixel region, that is, regarding each of dynamic superpixel and static superpixel, step S3 calculates multiple errors related to these superpixels combined with multiple candidate periods. The objective function configured to calculate these errors is as equation 1.

$$E(p,s) = E_{consistency}(p,s) + E_{static}(p,s) \quad \text{(Equation 1)}$$

E(p, s) is the objective function, p is the loop period of the superpixel, s is the start frame of the superpixel, $E_{consistency}$(p, s) is the term configured to determine the spatiotemporal consistency of the superpixel, $E_{static}$(p, s) penalizes the assignment of static loop pixels except in regions of the input video that are truly static. The calculation of $E_{consistency}$(p, s) will be introduced as follow.

$E_{consistency}$(p, s) of equation 1 is calculated as equation 2.

$$E_{consistency}(p,s) = E_{spatial}(p,s) + E_{temporal}(p,s) \quad \text{(Equation 2)}$$

From equation 2, regarding each of the superpixels, the error of this superpixel x includes an error of spatial consistency error and an error of temporal consistency. The error $E_{spatial}$(p, s) reflecting spatial consistency is calculated as equation 3.

$$E_{spatial}(p,s) = \Sigma_{\|x+z=1\|} \Psi_{spatial}(x,z) Y_s(x,z) \quad \text{(Equation 3)}$$

Regarding each superpixel x, equation 3 considers a superpixel z spatially adjacent to the superpixel x.

$Y_s(x, z)$ in equation 3 is calculated as equation 4.

$$\gamma_s(x, z) = 1 / \left(1 + \lambda_s MAD \underset{t_i}{MAD} \|V(x, t_i) - V(z, t_i)\|\right) \quad \text{(Equation 4)}$$

In equation 4, $\lambda_s$ is a constant, MAD represents Median Absolute Deviation. If the difference between two adjacent superpixels x and z is large in the input video, equation 4 reduces the consistency cost of this two superpixels x and z so that user is not easily to notice the inconsistency.

Please refer to equation 3. The spatial term $\Psi_{spatial}(x, z)$ which dominates the error of spatial consistency is calculated as equation 5.

$$\Psi_{Spatial}(x, z) = \quad \text{(Equation 5)}$$

$$\frac{1}{T}\sum_{t=0}^{T}\left(\begin{array}{l}\left\|\begin{array}{l}(V_{out}(x, t) - V_{out}(z, t)) - \\ (V_{in}(x, \phi(x, t)) - V_{in}(z, \phi(x, t)))\end{array}\right\|^2 + \\ \left\|\begin{array}{l}(V_{out}(x, t) - V_{out}(z, t)) - \\ (V_{in}(x, \phi(z, t)) - V_{in}(z, \phi(z, t)))\end{array}\right\|^2\end{array}\right)$$

$V_{out}(x, t)$ represents an estimated color of the output video at the position of the superpixel x at time t. $V_{in}(x, t)$ represents an estimated color of the input video at the position of the superpixel x at time t. The term $\Phi(x, t)$ is equation 5 is a time-mapping function and is calculated as equation 6.

$$\Phi(x,t) = s_x + ((t's_x) \bmod p_x) \quad \text{(Equation 6)}$$

Regarding a longer input video, the present disclosure uses equation 6 to map this input video to a shorter output video, and this output video has a start frame $s_x$ and a loop period $p_x$. For example, the input video has 9 frames and is played from frame 0 to frame 9, if the start frame is $7^{th}$ frame, and the loop period is 3 frames, the mapping result will be (7, 8, 9, 7, 8, 9, 7, 8, 9).

Please refer to equation 5. Regarding adjacent superpixels x and z, the equation 5 calculates a L2 difference between the first color difference of these two superpixels in the output video and the second color difference of these two superpixels in the input video. For example, if the moving object of the input video is a human body, the value calculated with equation 5 will reflect a consistency of this human body in the output video. For example, is the value calculated with equation 5 is greater than a certain number, some part of the moving object will probably disappear in a certain frame of the generated loop video and user may notice such inconsistency when he watches the video.

Please review the equation 2, the term $E_{temporal}(p, s)$ reflecting the error of temporal consistency is calculated as equation 7.

$$E_{temporal}(x) = \Sigma_x \Psi_{temporal}(x) Y_t(x) \quad \text{(Equation 7)}$$

The dominated term $\Psi_{temporal}(x)$ is calculated as equation 8.

$$\Psi_{temporal}(x) = \quad \text{(Equation 8)}$$

-continued $$\frac{1}{T}\sum_{t=0}^{T}\left(\begin{array}{l}\left\|\begin{array}{l}(V_{out}(x, t+1) - V_{out}(x, t)) - \\ (V_{in}(x, \phi(x, t)+1) - V_{in}(x, \phi(x, t)))\end{array}\right\|^2 + \\ \left\|\begin{array}{l}(V_{out}(x, t+1) - V_{out}(x, t)) - \\ (V_{in}(x, \phi(x, t+1)) - V_{in}(x, \phi(x, t)-1))\end{array}\right\|^2\end{array}\right)$$

Regarding the superpixel x, equation 8 calculates a first color difference between two consecutive frames of the output video, calculates the second color difference between the next frame at the end of the loop and the start frame at the beginning of the loop, and calculates the third color difference between the frame at the end of the loop and the previous frame before the beginning of the loop, and the L2 distance of the first color difference and the second color difference and the L2 distance of the first color difference and the third color difference are added. From a visual perspective of view, the error of temporal consistency not only reflects the temporal consistency of the two consecutive output frames during the playback of the loop video, but also reflects the temporal consistency of the looped video from the end of this playback to the beginning of the next loop.

It should be noticed that an embodiment of the present disclosure uses each of the moving pixel region and the fixed pixel region described in step S2 as the input of equations 1-8 related to error calculations. In another embodiment, equations 1-8 may use the moving pixel region only. In other words, an embodiment of the present disclosure takes the superpixel as the unit when evaluating the error of spatiotemporal consistency. The loop video generated based on the above concept not only preserves the temporal and spatial consistency in the pixel level, but also preserves the semantic consistency of the input video.

Please refer to step S4 of FIG. 1, which shows "determining a start frame and a loop period of the moving pixel region for each of the plurality of errors so as to obtain a plurality of start frames and a plurality of loop periods". The loop period is one of the plurality of candidate periods. For example, after step S3, regarding each subpixel x, this superpixel x has an error when the start frame is $S_i$ and the loop period is $P_j$, step S4 will consider all $(S_i, P_j)$ combinations satisfying $E_{i,j} < E_0$, wherein $E_0$ is a tolerable upper limit. In an embodiment of the present disclosure, the flow from step S3 to step S4 is to find a start frame s and a loop period p that minimize the term E(p, s) of equation 1, as shown in equation 9.

$$\min_{\{p_x, s_x\}} (E_{spatial} + E_{temporal}) \quad \text{(Equation 9)}$$

Please refer to step S5 of FIG. 1, which shows "generating a plurality of output frames according to the plurality of start frames and the plurality of loop periods". In general, given the setting of the start fame of a superpixel, we know that which frame should be extracted for this superpixel, and the loop period of this superpixel is also obtained, therefore, a plurality of output frames may be generated with respect to each superpixel obtained in step S4. For an example, step S5 selects one or more superpixels whose start frame is the $1^{st}$ frame from the start frames suitable to the multiple superpixels obtained in step S4 to form the first output frame of the loop video. For another example, regarding multiple loop periods obtained in step S4 and their multiples, step S5 finds the suitable start frame for each loop period, and then combines these start frames to form multiple output frames.

For further another example, step S5 searches for all combinations of all the start frames and all loop periods obtained in step S4, thereby generating multiple output frames. However, the present disclosure is not limited to the examples described above.

Please refer to step S6, "generating an output frame sequence from the plurality of output frames according to a loop parameter". The output frame sequence corresponds to a loop video. Specifically, after generating the first output frame, an example for determining the next output frame is shown as equation 10.

$$P_{i,j} = \exp\left(-\frac{D_{i+1,j}}{\sigma}\right) \quad \text{(Equation 10)}$$

$P_{i,j}$ is the probability of the transition from frame $i^{th}$ to frame $j^{th}$. $D_{i,j}$ is a frame transition cost and is calculated as equation 11.

$$D_{i,j} = \|V(\bullet,i) - V(\bullet,j)\| \quad \text{(Equation 11)}$$

According to equation 11, the frame transition cost is the cumulative color difference between each pixel in frame $i^{th}$ and the pixel corresponding to frame $j^{th}$. In other words, the greater the color difference between two adjacent frames is, the higher the cost of frame transition is.

In equation 10, the factor σ controls the mapping from pixel different to probability. In general, the frame with higher temporal consistency has a higher probability to be selected. In the situation that input video containing people, the smaller value of σ usually brings the strange repetition of human behavior. Moreover, the bigger value of σ results in a non-repetition frame but the discontinuous motion in the whole output frame sequence. In an embodiment of the present disclosure, setting the value of the factor σ adopts a static strategy, that is, the factor σ is a fixed value. In another embodiment of the present disclosure, since it is a trade-off between high variety and high temporal consistency, setting the value of the factor σ adopts a dynamic strategy. A smaller σ will be set when the output frame has poor temporal consistency and a bigger σ will be set to escape the small looping when the repetition occurs. The dynamic strategy proposes an adaptive function for the σ value as shown in equation 12.

$$\sigma(t) = \alpha_{entropy} \frac{1}{\hat{H}(t) + \alpha_{diffentropy} \hat{H}(t)'} - \max(\hat{D}(t), 0) \quad \text{(Equation 12)}$$

$\hat{H}(t)$ is the frame entropy estimation, $\hat{H}(t) = H(t+1) - H(t)$, $\hat{H}(t)'$ represents the trend of frame entropy, which is a difference between two consecutive $\hat{H}(t)$. $\hat{D}(t)$ is the short term average pixel transition error, which is the sum of the difference between the current frame and each of the previous frames. Said previous frames includes multiple frames of the played output video. Factors $\alpha_{entropy}$ and $\alpha_{diffentropy}$ are constants, the factor $\alpha_{entropy}$ controls the degree of the variety of the output frame sequence. The factor $\alpha_{diffentropy}$ controls the sensitivity of the trend of the frame entropy estimation.

The frame entropy is calculated as equation 13.

$$H(t) = -\frac{1}{N} \sum_x p_x(t) \log_2 p_x(t) \quad \text{(Equation 13)}$$

$H(t)$ is the frame entropy at time t. N is the maximum of the frame entropy and is associated with the total number of input frames. $p_x(t)$ is the probability of occurrence of each frame x. The frame entropy is the occurrence probability of each frame accumulated before the measurement time t. The frame entropy can instantly reflect the degree of dispersion of the current output frame.

The loop parameter comprises a frame entropy. Before generating the output frame sequence from the plurality of output frames according to the loop parameter, the present disclosure further comprises: determining a target frame and a historic frame, wherein the target frame is a next frame of the historic frame in a time domain; accumulating a probability of occurrence of each of the target frame and the historic frame to obtain an accumulated value; and selectively inserting the target frame after the historic frame into the output frame sequence according to the accumulated value and a historic frame entropy.

Figure 6:
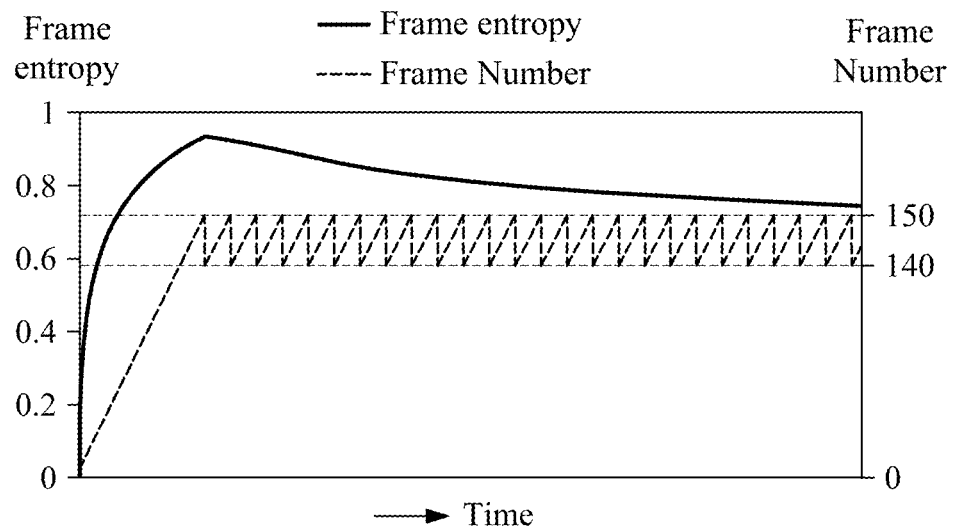
FIG. 6 is a relation diagram of the output frame sequence and the frame entropy.

Please refer to FIG. 6. FIG. 6 is a relation diagram of the output frame sequence and the frame entropy, wherein the setting of factor σ adopts the static strategy. When the output frame number increases from 1 to 150. Please refer to the number on the vertical axis on the right. No repeated frames are played when the output frame number gradually increases from 1 to 150, so the frame entropy gradually rises to about 0.95 as shown on the vertical axis on the left. The first loop playback starts when the output frame number returns from 150 to 140, and the frame entropy gradually decreases because of repeated frames. As shown in FIG. 6, when the number of looping of the same set of frames increases, the frame entropy is decreases.

Figure 7:
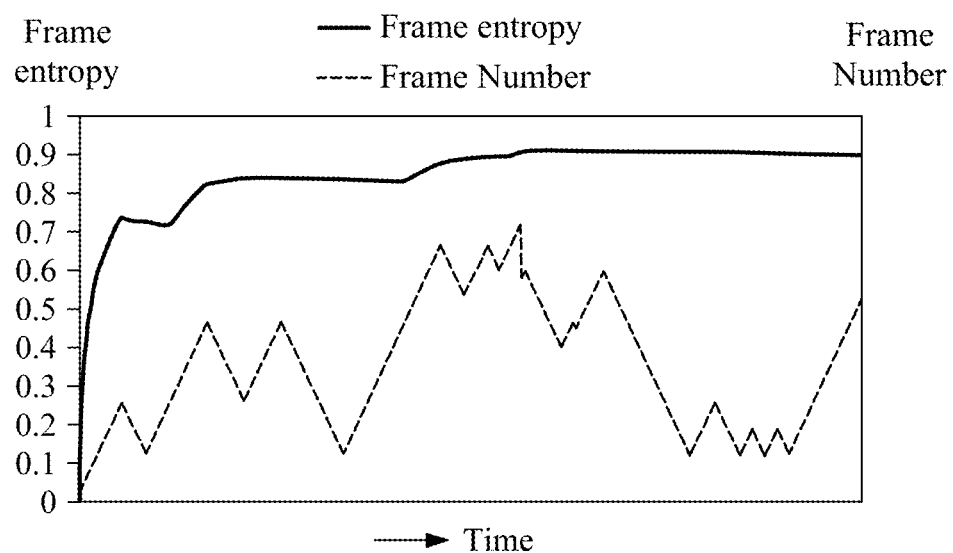
FIG. 7 is another relation diagram of the output frame sequence and the frame entropy.

Please refer to FIG. 7. FIG. 7 is another relation diagram of the output frame sequence and the frame entropy, wherein the setting of factor σ adopts the static strategy. FIG. 7 shows that a various output frame sequences can increase the overall trend of frame entropy. On the other hand, step S4 determines the frame number of the next output frame according to the frame entropy H(t) calculated according to equation 13, so as to enhance the visual variety of the loop video.

Regarding steps of calculating the start frame and the loop period, the above method of calculating the frame entropy can be an independent step. In other words, regarding an output video, any method can be used to calculate the start frame and loop period of each of multiple superpixels, and the result can be combined with the frame entropy calculation method in an embodiment of the present disclosure, and thereby improving the visual variety of the loop videos.

The character in the video may often move back and forth, such as pulling the bow of a cello back and forth. The present disclosure proposes the concept of "bounce point" for further improving the frame utilization rate and the selection diversity of the next output frame.

Figure 8:
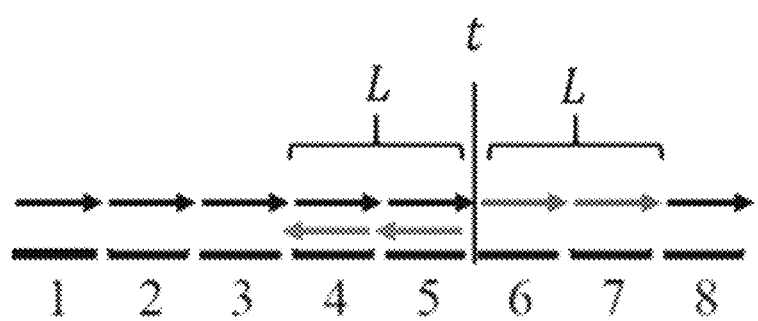
FIG. 8 is a schematic diagram of the bounce point and the bounce length in the output frame sequence.

Please refer to FIG. 8. FIG. 8 is a schematic diagram of the bounce point and the bounce length in the output frame sequence. FIG. 8 shows a playback sequence with a bounce point. The output video continuously played from frame $1^{st}$ to frame $5^{th}$, and then it meets the bounce point t. Those frames that have been just played will be played reversely until the duration of this reverse playback equals to the bounce length L, and then the output video continues to play in the original order. As shown in FIG. 8, the value of L is 2. In other words, after the frame $5^{th}$ and the frame $4^{th}$ are replayed, the output frame continues to play forward. The frame number output sequence in FIG. 8 is: 1→2→3→4→5→5→4→4→5→6→7.

The suitable bounce point lies in the middle of two symmetrical motions. In other words, when the rewinding version of the current action is similar to the normally played version of the next action, the output frame corresponding to the next action can be replaced with the output frame corresponding to the previous action. Taking FIG. 8 as an example, frames $4^{th}$ and $5^{th}$ show that a girl pulls the bow to the left, and frames $6^{th}$ and $7^{th}$ show that the girl pulls the bow to the right. Therefore, the subsequences of frames $5^{th}$ and $4^{th}$ can be used in the output frame sequence to replace the subsequences of frames $6^{th}$ and $7^{th}$.

The loop parameter comprises a probability of a bounce cost. Before generating the output frame sequence from the plurality of output frames according to the loop parameter, the present disclosure further comprises: determining a target frame, a precedent frame and a subsequent frame; wherein the target frame is a next frame of the precedent frame in a time domain, and the subsequent frame is a next frame of the target frame in the time domain; calculating a first motion vector from the precedent frame to the target frame, a second motion vector from the target frame to the subsequent frame, and a motion similarity between the first motion vector and the second motion vector; converting the motion similarity to the probability of the bounce cost; and selectively inserting the precedent frame after the target frame into the output frame sequence according to the probability of the bounce cost.

Before step S6 determines the frame number of the next output frame, an embodiment of the present disclosure calculates a motion cost firstly, and then determines whether to use a bounce motion subsequence with bounce length L as an output after the playback time t according to the probability corresponding to the motion cost. The motion cost is calculated as equation 14, wherein the bounce length is determined by user's requirement.

$$D_{bounce}(t,L)=\Sigma_{l=0}^{L}\omega_{bounce}\|\text{Motion}(t+l,t+l+1)-\text{Motion}(t-l,t-l-1)\|^2 \quad \text{(Equation 14)}$$

$D_{bounce}(t, L)$ compares each frame of two symmetric motions in a backward and forward direction starting from the bounce point t. The term Motion(t1, t2) represents the dense motion vector from frame $t1^{th}$ to $t2^{th}$. The dense motion vector between two frames may be estimated by optical flow method. There are many ways to calculate the optical flow between two adjacent frames and the present disclosure does not limit thereof. An embodiment of the present disclosure adopts the polynomial expansion method to estimate the optical flow of all superpixels in frames.

The bounce weight $\omega_{bounce}$ is calculated as equation 15.

$$\omega_{bounce}=\exp(l-L)+\exp(-l) \quad \text{(Equation 15)}$$

The bounce weight $\omega_{bounce}$ is designed to focus the calculation on those frames that close to the bounce point t because the playback at bounce point t is a discontinuous part of the input sequence. Thus, the motion symmetry at bounce point neighborhood is more important to other continuous part.

An embodiment of the present disclosure uses a simple exponential function to map the L2 distance to probability as shown in equation 16.

$$P_t=\exp(-D_{bounce}(t)/\sigma_{bounce}) \quad \text{(Equation 16)}$$

The factor $\sigma_{bounce}$ may be set to a small multiple of the average $D_{bounce}$ value to make the likelihood of bounce at a given frame is fairly low. Adjusting the value of the factor $\sigma_{bounce}$ can control the possibility of triggering a bounce point in a certain frame.

Therefore, the loop parameter described in step S6 include the probability of the bounce cost. When determining the next frame $t+1^{th}$, the present disclosure also considers whether the probability of the bounce cost $P_t$ of the current frame t is greater than a certain default value, and then determines whether to use the current frame t as the bounce point to replay previous frames.

The method for generating a loop video proposed according to an embodiment of the present disclosure increases the possibility of selecting the current frame as the bounce point when determining the next output frame, so the loop video may improve the frame utilization of the input video.

In sum, the present disclosure proposes a method for generating a loop video. The proposed method creates the loop video consisted of context-aware segments based on spatiotemporal consistency and semantic constraint, and the present disclosure ensures the completeness of moving object in the loop video. The present disclosure uses frame entropy to estimate the variety of output video and keep good variety in output by dynamic strategy method and bounce point extraction.

What is claimed is:

1. A method for generating a loop video comprising:
   obtaining an input video including a plurality of frames, wherein a first frame is included in the plurality of frames, each of the plurality of frames has a plurality of pixels;
   extracting a moving object from the input video, wherein the moving object corresponds to a moving pixel region in the first frame, and the moving pixel region includes at least two of the plurality of pixels of the first frame;
   inputting a plurality of candidate periods to a target function respectively to calculate a plurality of errors of the moving pixel region for respective ones of the candidate periods;
   determining a start frame and a loop period of the moving pixel region for each of the plurality of errors so as to obtain a plurality of start frames and a plurality of loop periods, wherein the loop period is associated with one of the plurality of candidate periods;
   generating a plurality of output frames according to the plurality of start frames and the plurality of loop periods; and
   generating an output frame sequence from the plurality of output frames according to a loop parameter, wherein the output frame sequence corresponds to the loop video;
   wherein each of the plurality of pixels in the first frame is a first pixel;
   wherein a second frame is included in the plurality of frames, each of the plurality of pixels in the second frame is a second pixel; and
   wherein extracting the moving object in the input video comprises:
     obtaining an attribute of the first pixel;
     determining one of the second pixels in the second frame, wherein an attribute of said one of the second pixels corresponds to the attribute of the first pixel;
     calculating a displacement between the first pixel and the second pixel whose attribute corresponds to the attribute of the first pixel;
     determining at least two of the plurality of first pixels as the moving pixel region, wherein the displacement of each of said at least two first pixels is in a specific range; and
     tracing a position of the moving pixel region in the second frame according to the displacement.

2. The method for generating the loop video of claim 1, wherein
the loop parameter comprises a frame entropy;
before generating the output frame sequence from the plurality of output frames according to the loop parameter, further comprises:
determining a target frame and a historic frame, wherein the target frame is a next frame of the historic frame in a time domain;
accumulating a probability of occurrence of each of the target frame and the historic frame to obtain an accumulated value; and
selectively inserting the target frame after the historic frame into the output frame sequence according to the accumulated value and a historic frame entropy.

3. The method for generating the loop video of claim 1, wherein
the loop parameter comprises a probability of a bounce cost;
before generating the output frame sequence from the plurality of output frames according to the loop parameter, further comprises:
determining a target frame, a precedent frame and a subsequent frame;
wherein the target frame is a next frame of the precedent frame in a time domain,
and the subsequent frame is a next frame of the target frame in the time domain;
calculating a first motion vector from the precedent frame to the target frame, a second motion vector from the target frame to the subsequent frame, and a motion similarity between the first motion vector and the second motion vector;
converting the motion similarity to the probability of the bounce cost; and
selectively inserting the precedent frame after the target frame into the output frame sequence according to the probability of the bounce cost.

4. The method for generating the loop video of claim 1, wherein before extracting the moving object from the input video, further comprises:
training an object recognition model according to a plurality of images associated with the moving object; and
extracting the moving object from the input video is to extract the moving object according to the object recognition model from the input video.

* * * * *